United States Patent [19]

Wolf et al.

[11] Patent Number: 5,090,539
[45] Date of Patent: Feb. 25, 1992

[54] PRESSURE-MEDIUM ACTUATED FRICTION DISK CLUTCH OR BRAKE

[75] Inventors: Andreas Wolf, Tettnang-Kau; Harald Breisch, Kressbronn, both of Fed. Rep. of Germany

[73] Assignee: Zahnradfabrik Friedrichshafen AG, Friedrichshafen, Fed. Rep. of Germany

[21] Appl. No.: 423,410

[22] PCT Filed: Mar. 2, 1988

[86] PCT No.: PCT/EP88/00152

§ 371 Date: Aug. 22, 1989

§ 102(e) Date: Aug. 22, 1989

[87] PCT Pub. No.: WO88/07144

PCT Pub. Date: Sep. 22, 1988

[30] Foreign Application Priority Data

Mar. 11, 1987 [DE] Fed. Rep. of Germany ....... 3707765

[51] Int. Cl.$^5$ .......................................... F16D 25/063
[52] U.S. Cl. ........................ 192/85 AA; 192/109 A; 192/109 F
[58] Field of Search ......... 192/109 F, 85 AA, 109 A, 192/3.29, 89 B; 188/71.5

[56] References Cited

U.S. PATENT DOCUMENTS

| | | | |
|---|---|---|---|
| 3,054,491 | 9/1962 | Bloch et al. | 192/109 F X |
| 3,190,421 | 6/1965 | Schulz | 192/109 F X |
| 3,266,608 | 8/1966 | Lemieux | 192/85 AA |
| 3,944,036 | 3/1976 | Koshelev | 192/109 F |
| 4,266,648 | 5/1981 | Martin | 192/109 F X |
| 4,290,513 | 9/1981 | Nishimura et al. | 192/3.3 X |
| 4,623,055 | 11/1986 | Ohkubo | 192/85 AA |
| 4,696,384 | 9/1987 | Huber | 192/109 A X |
| 4,934,502 | 6/1990 | Horsch | 192/85 AA |

FOREIGN PATENT DOCUMENTS

| | | |
|---|---|---|
| 2540191 | 3/1977 | Fed. Rep. of Germany . |
| 3441815 | 5/1985 | Fed. Rep. of Germany . |
| 805806 | 12/1936 | France . |
| 1575044 | 7/1969 | France . |

*Primary Examiner*—Rodney H. Bonck
*Attorney, Agent, or Firm*—Herbert Dubno

[57] ABSTRACT

A pressure-medium actuated friction disk clutch or -brake is provided having a piston/cylinder actuation unit (1,2) and a disk spring (3) arranged between the piston (1) and a pressure plate (4) of the friction disk clutch, whereby the binding surfaces (11, 41) for the disk spring (3) are generally perpendicular to the axis (A) of the friction disk clutch. In order to influence a characteristic force curve (K1, K2) at the closing of the friction disk clutch (4, 5, 6, 7), at least one of the binding surfaces (11, 41), has a definitely shaped, radially extending contour (R1, R2, R4, 13) deviating from the right angle. Due to the modified angle of attack and the rolling off of the contact point of the disk spring on the binding surface and the therewith connected shortening of the lever arm (H), any desired pressure characteristic can be achieved with a normally built disk spring. Placing a contour at the binding surface of the piston (1) and/or the pressure plate (4) is simple and cost-effective.

2 Claims, 3 Drawing Sheets

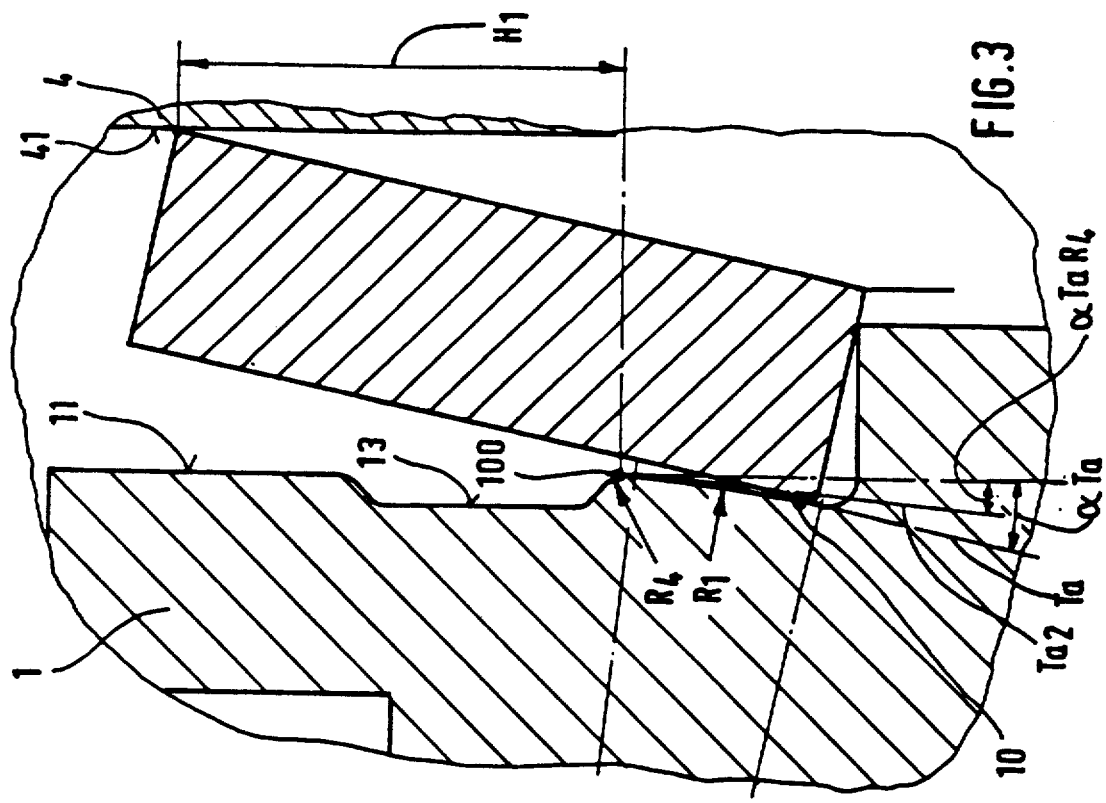
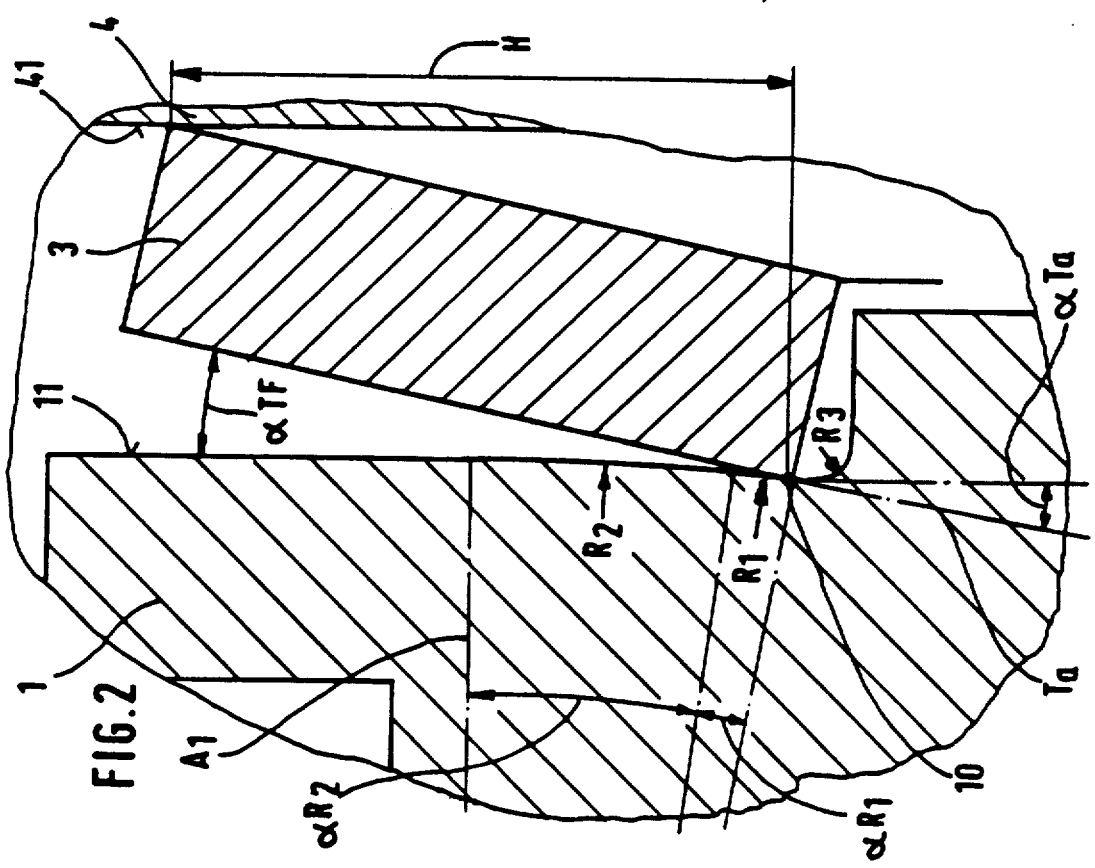

PRESSURE-MEDIUM ACTUATED FRICTION DISK CLUTCH OR BRAKE

FIELD OF THE INVENTION

The invention relates to a pressure-medium actuated friction disk clutch or brake.

THE RELATED ART

German Patent 25 40 191 discloses a pressure-medium actuated friction clutch wherein a disk spring is arranged between a clutch and an actuation device. This spring is prestressed between a pressure plate of the friction disk clutch and a slide disk, by means of a limit screw. In a rest closed position of the friction disk clutch, when it is not under the action of a pressure medium, the frictional coupling of the friction disk takes place depending on the layout of the disk spring.

German Patent 34 41 815 discloses a pressure-medium actuated friction disk clutch, wherein-between the pressure plate of the friction disk clutch, an axially fixed shaft and a piston of the actuation device -a disk spring is arranged which is conically shaped in cross section and has three radially staggered contact surface. The effective characteristic curve of the spring at the closing of the friction disk clutch is achieved due to the particular shape of the disk spring in cross section, to the arrangement of several disk springs with equal diameter, or only with an outer- or inner equal diameter, or due to disk springs having a plurality of square or slot-like cutouts, which can be located on the inner- as well as the outer diameter of the disk spring. The disk spring might help reduce the impact effect at the engagement of the friction disk clutch and also make possible an adjustment in the desired sense during the closing process, as well as accelerating the latter in comparison with the solution offered by German Patent 25 40 191. However, such spring or springs with a particular shape and configuration are expensive in comparison to standard spring and often also have a considerably shorter life. Besides, possible necessary high forces can not be transmitted.

From U.S. Pat. No. 3,266,608, a friction disk clutch is known, wherein the binding surface at the pressure plate has a special configuration.

The configuration of this binding surface, however, serves exclusively the purpose of insuring the adherence of the disk spring to the ring 92 in the open position of the clutch and to make possible a reversal of the travel direction of the disk spring during the closing process. Thereby, the partial flow of the pressure medium provided for a gentle engagement of the clutch is closed off via the disk spring and the plate 116. The gentle engagement of the clutch and the modification of the characteristic force curve by the disk spring is not achieved via its binding surfaces.

It is therefore the object of the invention to further develop a pressure-medium actuated friction disk clutch with the purpose of improving functional safety, of reducing cost of the used disk springs and of transmitting forces as high as possible with small space requirements, via the disk springs.

SUMMARY OF THE INVENTION

Now there has been developed a pressure-medium actuated friction disk clutch or brake comprising:
a cylinder;
a piston within the cylinder movable along an axis A;
a friction disk clutch adjacent the piston including a pressure plate;
a disk spring arranged between the piston and the pressure plate, respective binding surfaces being formed along faces of the piston and plate, the disk spring contacting the binding surfaces wherein a distance along a perpendicular to axis A between contact points on the binding surfaces defines a lever arm, the binding surfaces being generally perpendicular to axis A except that at least one of the binding surfaces has a portion that deviates from perpendicularly by being contoured to form a successive pair of curves each defined by a respective first and second radius along a direction of axis A, and contact between the disk spring and binding surface contour effecting a characteristic force curve upon engagement of the disk clutch or brake.

While according to the state of the art such as in German Patents 25 40 191 and 34 41 815 where specially produced disk springs are required, according to the present of the invention, standard springs can be used and selected according to a characteristic curve of the spring. These standard springs can be mass produced and therefore are inexpensive. At the same time these springs, are improved with respect to their service life. Since according to the invention, during the closing process of the friction disk clutch the effective lever arm is reduced between the binding points of the disk spring, it is possible to use relatively thin springs, which are particularly soft in the initial stage of the closing process and can thereby very well prevent impact effects, and as consequence of the lever arm shortening during the closing stage become sufficiently firm to transmit high forces, without completely losing their elasticity.

Starting with the pure characteristic curve of the spring, the characteristic force curve such a it is at the closing of the friction disk clutch, can be achieved only due to variable geometry at the binding surfaces of the piston or also of the end plate. Both solutions can be carried out simply and in a cost-effective manner. If different radii are joined to form a curved binding surface, the effective lever arm is shortened between the binding surfaces of the disk spring because the contact point for instance rolls off on the radii. Therefore, the characteristic force line does not ascend linearly, but depends on the shortening of the lever arm. This way, the closing of the friction disk clutch starts out very gentle, while in the closed position of the friction disk clutch high forces can be transmitted via the disk spring, whereby the disk springs can still afford a residual elasticity.

Of course the present invention is not intended to be limited to the exemplative specific features described. Those persons skilled in the art will from the invention description be directed to other embodiments all of which are within the purview and scope of the invention.

BRIEF DESCRIPTION OF THE INVENTION

The above and other objects, advantages and features of the invention will become more readily apparent from the following description, reference being made to the accompanying highly diagrammatic drawing in which:

FIG. 2 is a profile in expanded view of a binding surface of a disk spring against a piston surface, FIG. 3 is further profile according to FIG. 2.

DETAILED DESCRIPTION

Figure 1:
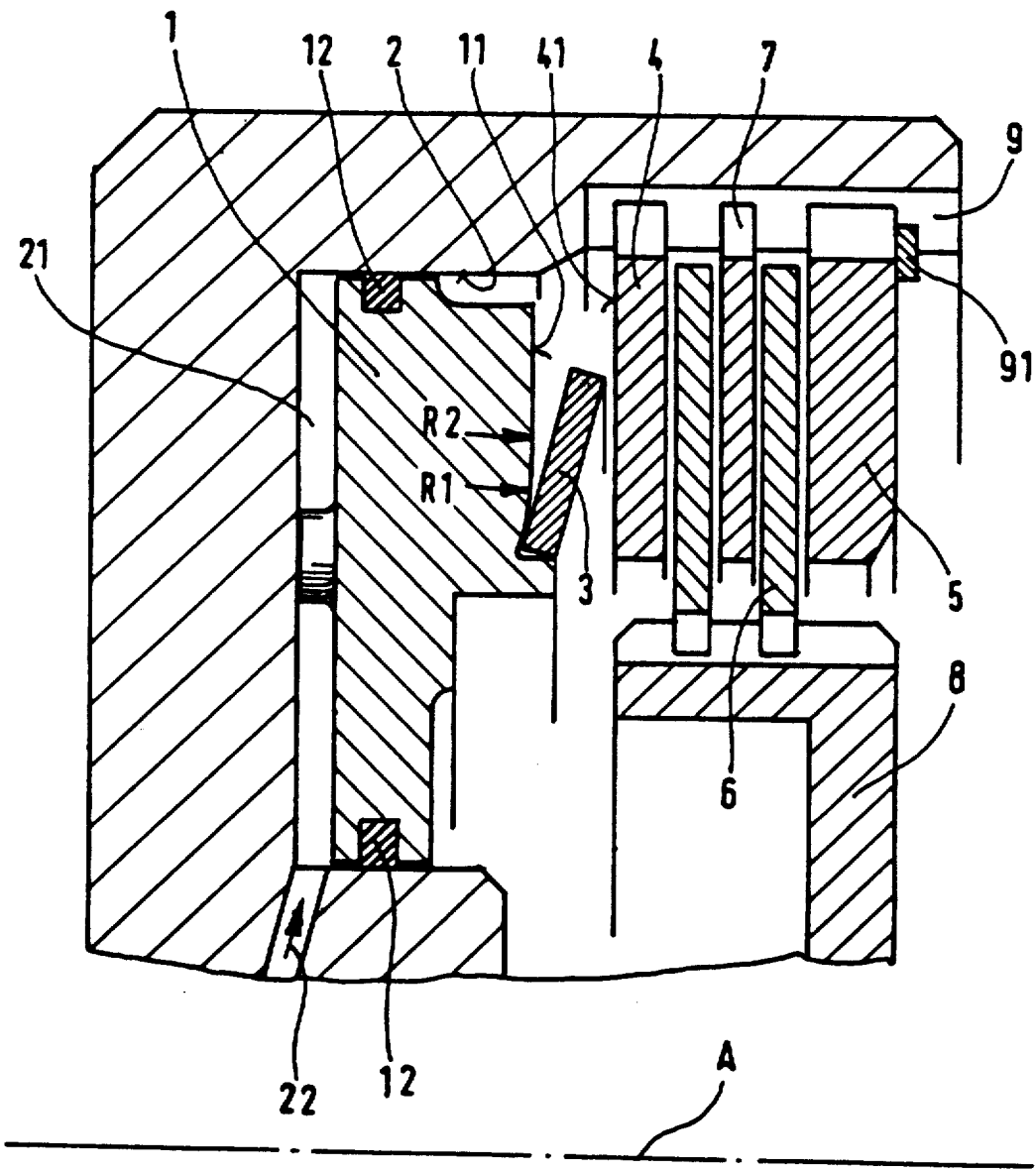
FIG. 1 is a friction disk clutch in half section.

FIG. 1 schematically illustrates in half section a friction disk clutch consisting of inner lamellae 6, outer lamellae 7, pressure plate 4, end plate 5, inner-lamellae carrier 8 and outer-lamellae carrier 9. Pressure plate 4 and end plate 5 are both non-rotationally supported in the outer-lamellae carrier 9. The friction disk clutch is actuated via piston/cylinder actuation device 1, 2, whereby a pressure chamber 21 is closed off by seals 12 located in piston 1. A disk spring 3 is provided between the piston 1 and the pressure plate 4.

Inner and outer lamellae 6, 7 and pressure plate 4 are supported axially slidably but non-rotatably in the inner-lamellae carrier 8 and the outer-lamellae carrier 9, while the end plate 5 is axially fastened at least in one direction, by a grooved ring 91. A binding surface 11 of the piston 1 has a contour R1, R2 deviating from a right angle towards an axis of rotation A, these contours being composed of certain geometrical contours succeeding each other in radial direction to thereby create a binding surface curved in a radial direction.

FIG. 2 shows a first example of the binding surface 11 at the piston 1 centeracting with disk spring 3, which inwardly adheres radially to the piston 1 and outwardly adheres radially to an pressure plate 4. In the area of the inner radial binding surface 11, disk spring 3 has an orientation deviating from a right angle relative to the axis direction A1 and is defined by two radii R1, R2, succeeding each other in a radial direction. This way, the contour of the binding surface 11 is composed of a small, radially internal radius R1, a of subsequently arranged larger radius R2 and of a straight line perpendicular to the axis direction A1. The smaller radius leads over for instance, extends over an angle of 3° and the larger radius over an angle of 6°, so that the tangent Ta of the small radius R1 deviates by an angle of $TA = 9°$ from the straight line of the binding surface 11. This angle has to be smaller than the angle of attack TF, which results in the relaxed position between the disk spring 3 and the straight line of the binding surface 11 extending at a right angle to the axis direction A1.

FIG. 3 corresponds to FIG. 2, with the difference that the contour in the area of the radial internal binding surface has in addition to the already described radially internal small radius R1, also a very small radius R4, e.g. of 0.5 mm, forming an offset 13. The common tangent Ta2 of the radii R1 and R4 has thereby also to have an angle TaR4 to the vertical on the axis A.

Figure 4:
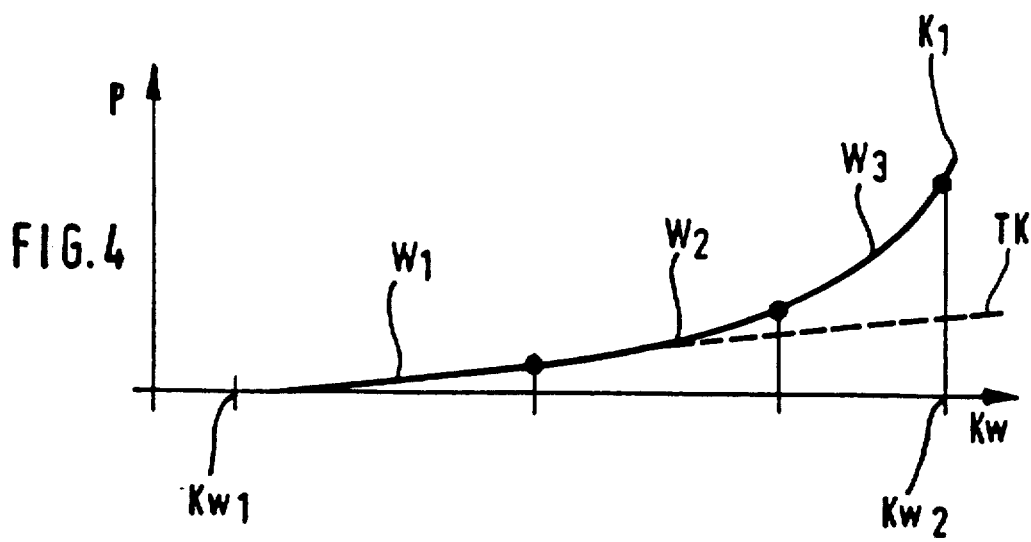
FIG. 4 is characteristic force line graph according to the profiled binding surface from FIG. 2.
Figure 5:
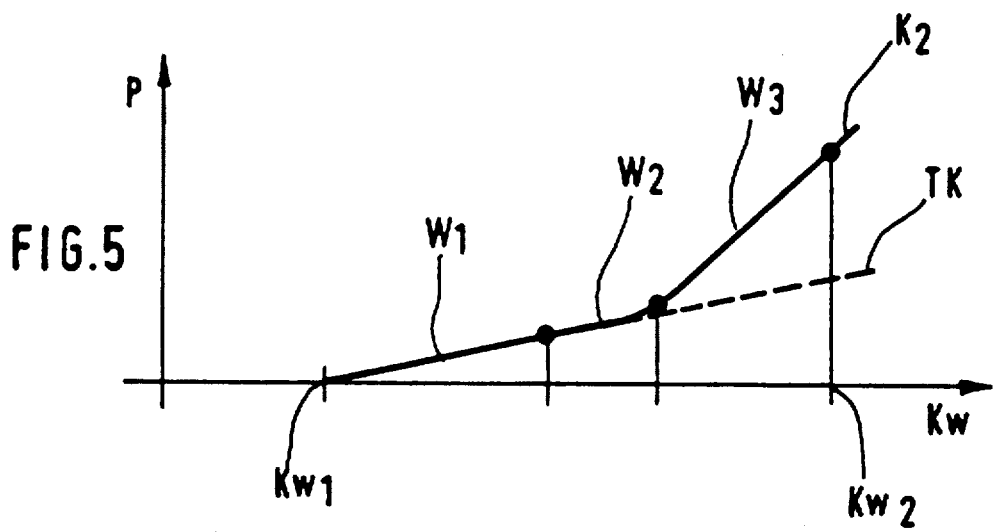
FIG. 5 is a force line graph according to the binding surface from FIG. 3.

FIG. 4 shows the characteristic force curve resulting from the contour of the binding surface 11 at the piston 1 according to FIG. 2. In and FIG. 5 is shown the characteristic force curve K2 which is represented according to the binding surface 11 in FIG. 3. The characteristic curves of the disk springs are marked TK, and they establish themselves each time in accordance with the selected dimensions of the used disk springs 3. Force P is repesented above the vertical and the piston travel Kw along the horizontal axis. Kw1 marks the point where the piston 1, the disk spring 3, the pressure plate 4 and all inner- and outer lamellae 6 and 7 contact each other and to the end plate 5. The characteristic force curve K1 in the path segment W1 results from the angle difference between the angle of the tangent Ta of the radius R1 and the angle of attack TF of the disk spring 3 in the contact point 10. The continuation of this straight line is the characteristic line TK, which would be effective if the binding surface for instance on the piston were to run at a right angle to the axis A of the friction disk clutch and not have any definitely shaped radially running contour, and the contact point 10 were to remain in principle unchanged, at this point. The characteristic force curve K1 assigned to the path segment W2 is created as a result of the change in the lever arm, which occurs when the disk spring 3 with its contact 10 rolls off small radius R1 of the contour of the piston 1, while the piston continues to travel in the engagement direction. Due to the relatively small radius R1, the change in the lever arm and thereby the force increase is small, in a relatively long path. The steeper ascent of the characteristic force curve K1 in the path segment W3 results from the rolling-off of the disk spring 3 with the contact point 10 from the larger radius R2 of the contour of the piston 1. The tangents of the radii R1 and R2 are identical in the transition point of these two radii, so that between the path segments W2 and W3 no offset occurs in the characteristic force curve. The large radius R2 causes a marked shortening of the lever arm during a small axial travel path of the piston 1, and thereby a relatively steeper force increase. At the point Kw2, the clutch is fully closed and transmits the full torque, whereby the disk spring is pressed together to approximately one quarter of its axial deflection. Through a free selection of a standard spring and through intentional selection of the configuration of at least one binding surface, e.g. the binding surface 11 of the piston 1, through an arrangement in succession of defined contours in radial direction it is possible to maintain any desired characteristic force curve, e.g. K1, so that all intended conditions are met when the clutch closes.

Figure 6:
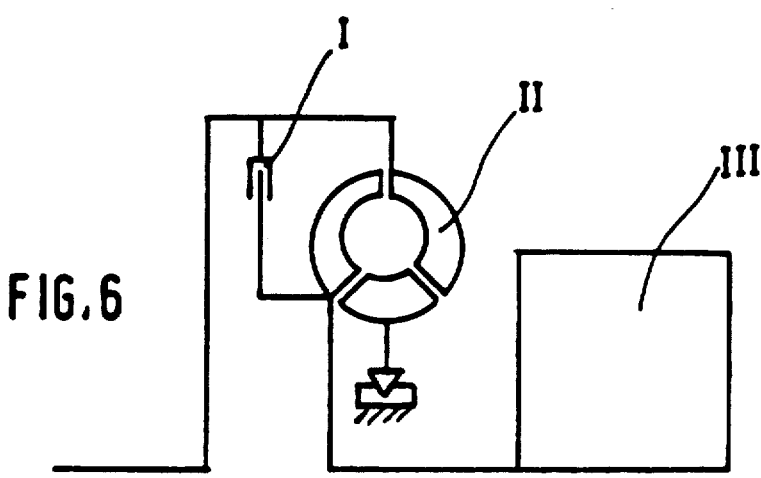
FIG. 6 is a by-pass coupling in a torque converter.

In the second embodiment example according to FIGS. 3 and 5, the course of the first two marked path segments W1 and W2 is the same as already described. However, the small radius R1 is selected larger i.e. R1 according to FIGS. 2 and 4 is about 20 mm while R1 according to FIG. 3 and 5 is about 36.5 mm. In this way, there is a steeper slope to the characteristic force curve K2 in the path segment W2 of FIG. 5. As shown in FIG. 3, an additional very small radius R4 is added so that the contact point 10 in the closed position 100 does not roll off an further Thus, the path segment 3 in FIG. 5 is a straight line which slopes relatively steeply, whereby this slope is dependent on the effective lever arm H1, which remains approximately constant for the rest of the path. The pressure-medium actuated friction disk clutch, which of course can also be a friction disk brake, works as follows: Via the pressure-medium supply duct 22, a pressure medium is guided into pressure chamber 21 to actuate piston 1. Force is then applied by piston 1 against disk spring 3 and pressure plate 4 which then brings together the inner- and outer lamallae 7, 8 so that they rest against end plate 5. Thereby the contact point Kw1 according to FIGS. 4 and 5 is reached. Onward from point Kw1 operation is dependent on the geometry resulting from the angle relationships, i.e. angle of attack TF of the disk spring 3 and angle Ta, of the tangent Ta— from the binding surface 11 and the disk spring 3. An increasing shortening of the lever arm results in an increasing steepness of the characteristic curve of the spring and a progressively increasing pressure P (moment) in the lamellar packet. The characteristic force curve K1, K2 of the path segment W1 corresponds approximately to the characteristic spring curve TK of the selected disk spring 3. Depending on the contour of the binding surface , e.g. R1+R2 according to FIGS. 2 and 4, or R1 +R4 according to FIGS. 3 and 5, the frictional disk clutch is frictionally engaged for the transmission of the torque. Thereby, the clutch is in a simple manner adjustable to all load situation, only by selecting a simple disk spring—standard spring—and a suitable contour at the binding surface, e.g. 11. By venting the pressure chamber 21, the friction disk clutch is opened, whereby in many application cases the generally known opening spring (not shown) is not required, because the disk spring 3 is arranged between the piston 1 and the pressure plate 4. Particularly well suited is the solution shown for the use as a by-pass coupling I in a hydrodynamic torque converter II, which is precedingly connected with a transmission III (FIG. 6).

The invention is not limited only to the features represented in the embodiment examples, but also includes variations thereof such as the binding surface being arranged in the same sense on the pressure plate 4 or having two binding surfaces, on the piston and on the pressure plate which are shaped according to the invention. The embodiment of a friction disk brake according to the invention is not represented, since in this case the same conditions result in connection with the binding surface at the piston, or pressure plate. As in the already described friction disk clutch, only the piston/cylinder-actuation device and the outer-lamellae carrier are mounted in or on stationary components, e.g. in or on a transmission housing.

We claim:

1. A pressure-medium actuated friction disk clutch or-brake comprising:
 a cylinder;
 a piston within said cylinder movable along an axis
 a friction disk clutch adjacent the piston including a pressure plate;
 a disk spring arranged between said piston and said pressure plate, respective binding surfaces being formed along faces of said piston and said plate, said disk spring contacting said binding surfaces wherein a distance along a perpendicular to axis A between contact points on said binding surfaces defines a lever arm, said binding surfaces being generally perpendicular to axis A except that at least one of said binding surfaces has a portion that deviates from perpendicularity by being contoured to form a successive pair of curves defined by a respective first and second radius along a direction of said axis, and contact between said disk spring and binding surface contour between said disk spring and binding surface contour effecting a characteristic force curve upon engagement of the disk clutch or-brake;
 said characteristic force curve for a travel path of said piston between an initial contact point and a final contact point indicating a closed clutch position being defined by:
  an angular difference between a tangent of said first radius at said initial contact point and an angle of attack, said angle of attack being formed between a major outer surface of said spring disk and said perpendicular binding surface of said piston;
  a change in said lever arm distance measured from said first radius which is the smaller of said two radii; and
  a change in said lever arm distance measured from said second radius which is the larger of said two radii.

2. A pressure-medium actuated friction disk clutch or-brake comprising:
 a cylinder;
 a piston within said cylinder movable along an axis A;
 a friction disk clutch adjacent the piston including a pressure plate;
 a disk spring arranged between said piston and said pressure plate, respective binding surfaces being formed along faces of said piston and said plate, said disk spring contacting said binding surfaces wherein a distance along a perpendicular to axis A between contact points on said binding surfaces defines a lever arm, said binding surfaces being generally perpendicular to axis A except that at least one of said binding surfaces has a portion that deviates from perpendicularity by being contoured to form a successive pair of curves defined by a respective first and second radius along a direction of said axis, and contact between said disk spring and binding surface contour effecting a characteristic force curve upon engagement of the disk clutch or-brake;
 said binding surface of said piston having an offset segment fashioned as a radially oriented curved recess therewithin;
 said characteristic force curve for a travel path of said piston between in initial contact point and a final contact point indicating a closed clutch position being defined by:
  an angular difference between a tangent of said first radius at said initial contact point and an angle of attack, said angle of attack being formed between a major outer surface of said spring disk and said perpendicular binding surface of said piston;
  a change in said lever arm distance measured from said first radius which is the smaller of said two radii; and
  an almost constant, relatively small lever arm whose distance is measured starting from a second contact point, said second contact point being at a transition point of curvature demarking a border of said curved recess.

* * * * *